United States Patent
Song et al.

(10) Patent No.: US 12,031,088 B2
(45) Date of Patent: Jul. 9, 2024

(54) METHOD FOR STABILIZING $CO_2$ MICROBUBBLE BY INJECTING NANOPARTICLES TO ENHANCE GEOLOGICAL STORAGE

(71) Applicant: DALIAN UNIVERSITY OF TECHNOLOGY, Dalian (CN)

(72) Inventors: Yongchen Song, Dalian (CN); Lanlan Jiang, Dalian (CN); Sijia Wang, Dalian (CN); Xin Wang, Dalian (CN); Mingjun Yang, Dalian (CN); Yu Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/180,878

(22) Filed: Mar. 9, 2023

(65) Prior Publication Data
US 2023/0295487 A1  Sep. 21, 2023

(30) Foreign Application Priority Data
Mar. 15, 2022 (CN) .......................... 202210252055.6

(51) Int. Cl.
*C09K 8/594* (2006.01)

(52) U.S. Cl.
CPC .......... *C09K 8/594* (2013.01); *C09K 2208/10* (2013.01)

(58) Field of Classification Search
CPC ....... C09K 8/594; C09K 2208/10; C09K 8/58
See application file for complete search history.

(56) References Cited

U.S. PATENT DOCUMENTS

| 2012/0118586 A1* | 5/2012 | Kameyama | ........... E21B 43/164 166/90.1 |
| 2017/0370200 A1* | 12/2017 | Zhang | ..................... E21B 43/38 |
| 2021/0220784 A1* | 7/2021 | Zhang | ................... B01F 35/712 |

(Continued)

FOREIGN PATENT DOCUMENTS

| CN | 107339108 A | 11/2017 |
| CN | 114113550 A | 3/2022 |

(Continued)

OTHER PUBLICATIONS

Translation of WO 2021107048 A1 (Year: 2021).*

(Continued)

*Primary Examiner* — Angela M DiTrani Leff
(74) *Attorney, Agent, or Firm* — Nitin Kaushik

(57) ABSTRACT

A method for enhancing geological storage by injecting nanoparticles to stabilize $CO_2$ microbubbles, which belongs to the technical field of multiphase flow. The method first improves the physical properties of the fluid by pre-mixing $CO_2$ and nanoparticles, and then the fluid is transported to the underground through high-pressure pipelines, and then $CO_2$ microbubbles containing nanoparticles are generated through a dense perforated plate arranged by an injection well to improve the dissolution rate and sweep efficiency of the gas in the saline aquifer, so as to enhance the later mixing of the fluid. The combined injection can improve $CO_2$ storage capacity and storage safety, and further reduce the risk of gas leakage in the reservoir.

1 Claim, 2 Drawing Sheets

Flow chart of nanoparticles mixed $CO_2$ to improve interfacial stability

(56) References Cited

U.S. PATENT DOCUMENTS

| | | | | |
|---|---|---|---|---|
| 2023/0050105 A1* | 2/2023 | Ben-Zvi | ............. | E21B 41/0064 |
| 2023/0235214 A1* | 7/2023 | Hasan | ................ | E21B 41/0064 |
| | | | | 166/279 |
| 2023/0313645 A1* | 10/2023 | Al-Qasim | ........... | E21B 41/0064 |
| | | | | 166/250.01 |

FOREIGN PATENT DOCUMENTS

| | | | | | |
|---|---|---|---|---|---|
| JP | 2008307483 A | * | 12/2008 | ........... | E21B 1/0064 |
| JP | 2009112995 A | * | 5/2009 | ............ | B01F 3/0446 |
| JP | 2018043176 A | | 3/2018 | | |
| WO | WO-2021107048 A1 | * | 6/2021 | ............. | C09K 8/594 |
| WO | WO-2022201424 A1 | * | 9/2022 | | |

OTHER PUBLICATIONS

Translation of WO 2022201424 A1 (Year: 2021).*
Translation of JP-2009112995-A (Year: 2009).*
Translation of JP-2008307483-A (Year: 2008).*

* cited by examiner

Flow chart of nanoparticles mixed CO₂ to improve interfacial stability

Experimental data of improving convective interface stability with different concentrations of nanoparticles

METHOD FOR STABILIZING $CO_2$ MICROBUBBLE BY INJECTING NANOPARTICLES TO ENHANCE GEOLOGICAL STORAGE

CROSS-REFERENCE TO RELATED APPLICATIONS

The application claims priority to Chinese patent application No. 202210252055.6, filed on Mar. 15, 2022, the entire contents of which are incorporated herein by reference.

TECHNICAL FIELD

The present invention is in the field of multiphase flow technology and relates to a method for enhancing geological storage by injecting nanoparticles to stabilize $CO_2$ microbubbles.

BACKGROUND

A large number of greenhouse gas emissions, mainly $CO_2$, cause global warming, and greenhouse gas emission reduction has become the focus of global attention. Among them, $CO_2$ capture and storage (CCS) technology has become an effective way to reduce greenhouse gas emissions, especially for underground saline aquifers with large storage capacity, deep burial depth, and wide distribution range. For example, in China, the Shenhua Ordos project has successfully launched the first 300,000-ton-scale CCS full-process demonstration project. Therefore, the current $CO_2$ saline aquifer storage prospect is good, and the first marine saline aquifer storage project is also built in the South China Sea.

The saline aquifer mainly captures the injected $CO_2$ through residual storage and dissolution storage, that is, $CO_2$ continuously displaces and migrates upwards after injection, then reaches the cap rock and dissolves in reservoir brine to form an acidic solution, and finally, convective mixing occurs to further increase the dissolved amount. However, the dissolution and storage capacity after $CO_2$ injection and the safety of storage are the most concerned issues in current projects. Firstly, the reservoir pressure is likely to rise after the $CO_2$ injection, and part of the gas may leak through the sealing barrier to the groundwater layer or through the abandoned borehole to the surface over time. Secondly, the reaction of $CO_2$ with saline water can cause local mineral rock dissolution, which may cause the following problems: first, the channel is formed after the rock is dissolved, the permeability of the cap rock increases, and the upward escape of $CO_2$ is intensified; second, the mechanical strength and compressive strength of the reservoir decrease, and the reservoir may be damaged. All of these will lead to the risk of $CO_2$ leakage and decreased storage capacity. However, accelerating the dissolution and mixing between $CO_2$ and saline water can not only increase the storage capacity, but also alleviate the gas leakage in the reservoir, so an efficient geological storage technology is urgently needed.

SUMMARY

Considering the problems of the slow dissolution rate of $CO_2$ in the process of residual storage and dissolution storage, and poor safety of storage at the late stage of dissolution under reservoir conditions, the present invention proposes a method for accelerating the dissolution of $CO_2$ and saline water in the reservoir, namely, a method for enhancing geological storage by injecting nanoparticles to stabilize $CO_2$ microbubbles. The density, viscosity, and wettability of the original injected fluid changed by injecting micron-sized $CO_2$ of pre-mixed nanoparticles, thereby reducing the buoyancy of $CO_2$ and enhancing post-mixing while increasing the $CO_2$ sweep area. Finally, the $CO_2$ storage capacity is increased and the risk of reservoir leakage is reduced.

The present invention generates a plurality of $CO_2$ microbubbles below 100 μm in diameter by pre-mixing $CO_2$ into nanoparticles in a high-pressure pipeline and then passing through a well hole with a dense perforated plate. This combined injection mode can significantly improve the physical properties of the injected fluid, thus reducing the buoyancy of $CO_2$ and enhancing the mixing of $CO_2$ and saline water in the later stage. Further mixing of the fluid through the perforated plate at the bottom of the well to generate fine-scale $CO_2$ microbubbles can further enhance gas sweep efficiency and enhance dissolution. The system can effectively improve the $CO_2$ storage capacity and ensure the safety of the saline water layer.

A method for enhancing geological storage by injecting nanoparticles to stabilize $CO_2$ microbubbles comprising the following steps:

step I: determining a location of an injection well;

selecting the region with gentle terrain, stable geological structure, and good storage ability as the storage position, installing the injection well in a reasonable reservoir depth, installing monitoring devices around the injection wells, and using deep and shallow monitoring technology to monitor the risk of leakage and blockage in real time.

step II: obtaining nanoparticles;

charging the raw material collection tank with the raw material for preparing nanoparticles, the raw material entering through a pipeline into a nano-sand mill for grinding, and then passing through the pipeline and a valve into a nanoparticle filter to filter out nanoparticles with a nanoparticle size <500 nm.

step III: pre-mixing $CO_2$ and nanoparticles;

opening the valve and continuously introducing $CO_2$ into the $CO_2$ high-pressure pipeline at a constant flow rate; opening the valve, allowing the nanoparticles to flow through the nanoparticles high-pressure pipeline into the mixer uniformly and constantly, and after both continuously introducing into the mixer until thoroughly mixing, closing both valves.

step IV: generating $CO_2$ microbubbles in the reservoir by constant pressure injection;

by opening the injection well valve and injecting the mixed fluid into the fluid in the reservoir at an appropriate injection rate while keeping the reservoir pressure stable, placing a dense perforated plate in the injection well shaft, and allowing the fluid to flow through the dense perforated plate at the bottom of the well to generate $CO_2$ microbubbles containing nanoparticles.

The nano-sand mill has a fineness of grind of ≤200 nm to grind and disperse the raw materials by friction and shear forces generated by the motion of the grinding media.

The nanoparticle filter consists of a nanofiltration plate, a diameter <1 mum and a leak detection sensor to ensure that the filtered particles are on the nanometer scale.

The mixer consists of a temperature and pressure monitoring device and a high-pressure magnetic stirrer to effectively enhance mixing while maintaining fluid temperature and pressure.

The dense perforated plate is composed of a corrosion-resistant material, 1 nm<average pore size <1 μm, and is used for generating micron-sized $CO_2$ bubbles while allowing nanoparticles to pass through; impurity filter plates are prearranged in front of the dense perforated plates to prevent clogging of the perforated plates.

The raw materials for preparing nanoparticles are a part of carbon nanoparticles, or highly hydrophilic metal-based/metalloid nanofluids (such as $SiO_2$, $Fe_2O_3$, etc.), or a part of highly wettable industrial waste residues (waste cement powder and blast furnace slag), or other types of nanoparticles capable of improving fluid interface properties, and combinations and mixtures of any of the above nanoparticles.

Advantageous effects of the present invention are: the present invention provides a method for enhancing geological storage by injecting nanoparticles to stabilize $CO_2$ microbubbles, wherein the buoyancy generated by $CO_2$ in a reservoir is reduced by pre-mixing nanoparticles to change the physical properties of the injected fluid, and at the same time, the initial moment of convective mixing is shortened to enhance the convective mixing of $CO_2$ and saline water; nanoparticles can improve the thermal properties, thermal conductivity, viscosity and density of the fluid after mixing with $CO_2$. When the mixed fluid is dissolved in saline water at the end of storage, the density difference between the mixed fluid and in-situ saline water is larger, thermal conductivity is enhanced, surface tension is reduced, etc. Using the improved fluid properties can effectively shorten the unstable onset time and mixing time of the convective mixing in the dissolution storage process, thereby enhancing dissolution.

The $CO_2$ microbubbles generated by the perforated plate further improve the gas sweep efficiency, dissolution rate, and porosity utilization. The two methods cooperate to change the physical properties and distribution characteristics of $CO_2$ to maximize the dissolution of $CO_2$ in the reservoir.

In the figures: 1. raw material collection tank, 1a. pipeline, 2. nano mill, 2a. pipeline, 2b. valve, 3. leak detection sensor, 4. nanoparticle filter, 4a. nanoparticle valve, 4b. nanoparticle pipeline, 5. nanofiltration plate, 6. mixer, 6a. $CO_2$ high-pressure pipeline, 6b. $CO_2$ valve, 6c. injection well valve. 6d. injection well pipeline, 7. monitoring device, 8. impurity filtering plate, 9. dense perforated plate, 10. injection well shaft, 11. temperature and pressure monitoring device, 12. high-pressure magnetic stirrer.

DETAILED DESCRIPTION OF THE EMBODIMENTS

Best Mode for Carrying Out the Invention Hereinafter, embodiments of the present invention will be described in detail with reference to the accompanying drawings.

Example 1

Figure 1:
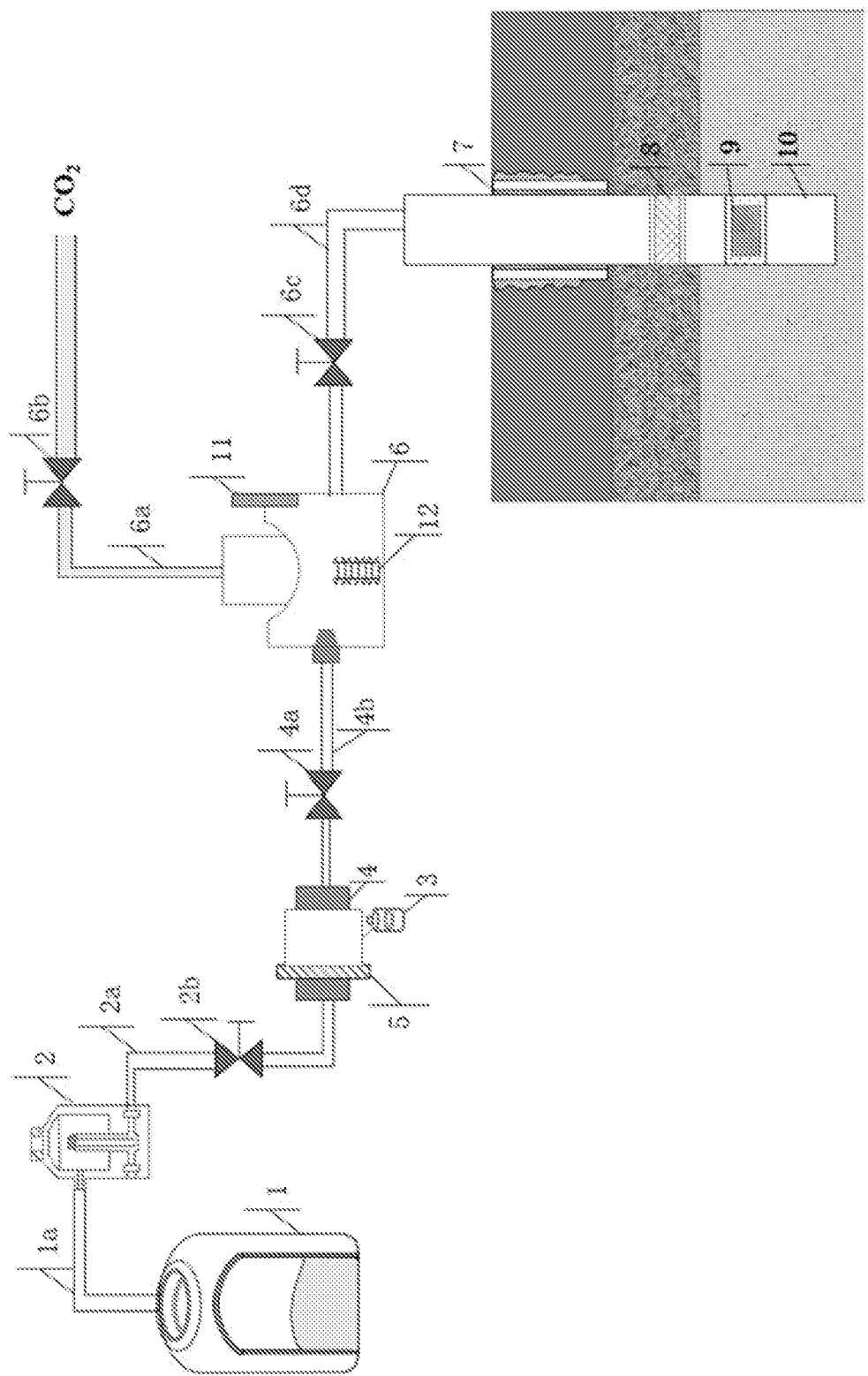
FIG. 1 is a flow chart of a method for enhancing geological storage by injecting nanoparticles to stabilize $CO_2$ microbubbles.

FIG. 1 is a schematic diagram of a method for stabilizing $CO_2$ microbubbles by injecting $SiO_2$ nanoparticles to enhance geological storage, and the method is further described in conjunction with FIG. 1:

step I: determining a location of an injection well;
selecting the region with gentle terrain, stable geological structure, and good storage ability as the storage position, installing the injection well in a reasonable reservoir depth, installing monitoring devices 7 around the injection wells, and using deep and shallow monitoring technology to monitor the risk of leakage and blockage in real time;

step II: obtaining $SiO_2$ nanoparticles;
charging the raw material collection tank 1 with the raw material for preparing $SiO_2$ nanoparticles, the raw material entering through a pipeline into a nano-sand mill 2 for grinding, and then passing through a nanoparticle filter 4 to filter out nanoparticles with a nanoparticle size <500 nm.

step III: pre-mixing $CO_2$ and $SiO_2$ nanoparticles;
continuously introducing $CO_2$ into the $CO_2$ high-pressure pipeline at a suitable flow rate; then allowing the $SiO_2$ nanoparticles to flow through the nanoparticles high-pressure pipeline into the mixer 6 uniformly and constantly, and both continuously introducing into the mixer until thoroughly mixing.

step IV: generating $CO_2$ microbubbles in the reservoir by constant pressure injection;
by opening the injection well valve and injecting the mixed fluid into the fluid in the reservoir at 0.05 ml/min while keeping the reservoir pressure stable, placing a dense perforated plate 9 in the injection well shaft, and allowing the fluid to flow through the dense perforated plate at the bottom of the well to generate $CO_2$ microbubbles containing $SiO_2$ nanoparticles.

Firstly, $SiO_2$ nanoparticles can improve the thermal properties, thermal conductivity, viscosity, and density of the fluid after mixing with $CO_2$. When the mixed fluid is dissolved in saline water at the end of storage, the density difference between the mixed fluid and in-situ saline water is larger, thermal conductivity is enhanced, surface tension is reduced, etc. Using the improved fluid properties can effectively shorten the unstable onset time and mixing time of the convective mixing in the dissolution storage process, thereby enhancing dissolution.

Figure 2:
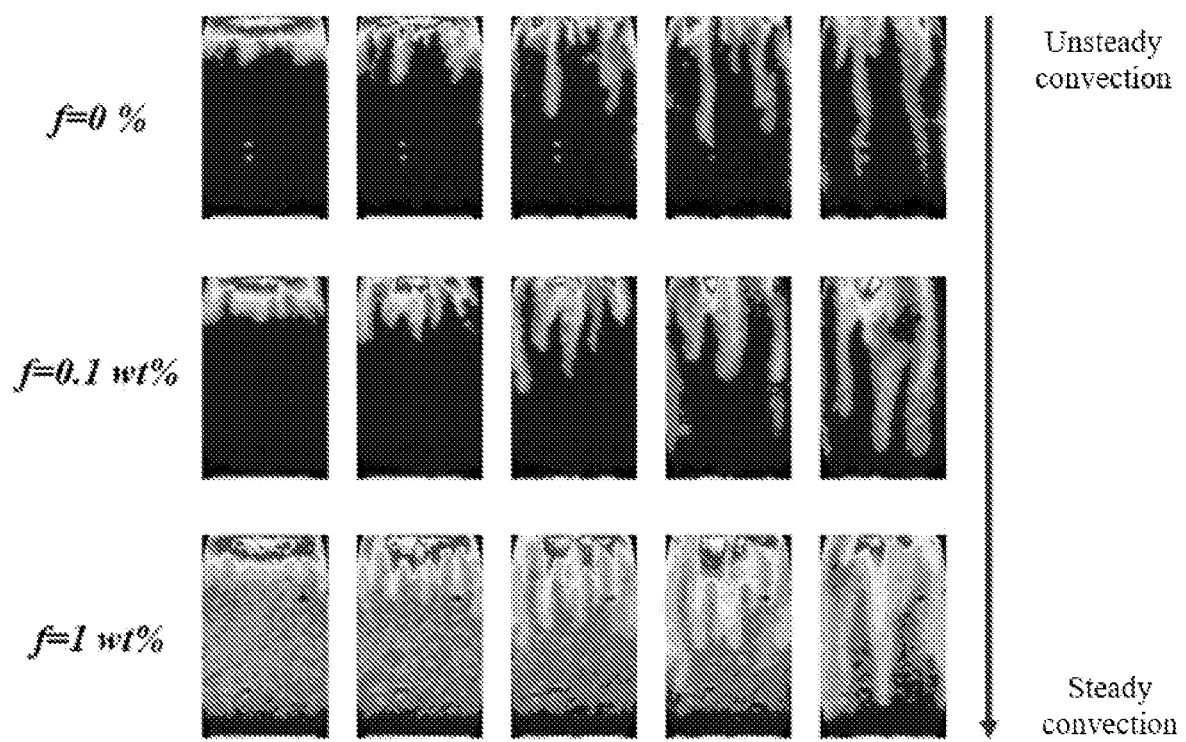
FIG. 2 shows the effect of different concentrations of nanoparticles on improving convective interface stability.

In order to simplify the process of $CO_2$ geological storage by nanoparticles mixed with $SiO_2$, the influence of $CO_2$ injection into nanoparticles fluid on the stability of fluid phase interface in the convective mixing process was analyzed in the laboratory by using a simulated fluid pair method to produce fluid with density difference (density and viscosity characteristics are selected according to geology fluid characteristics). The mass fractions (0 wt %, 0.1 wt %, 1 wt %) of the superhydrophilic $SiO_2$ nanoparticles were added into the heavy fluid to study the optimal mixing ratio, and geology convection characteristics were studied by calculating dimensionless parameters. The interface stability improvement effect is shown in FIG. 2. Adding a certain concentration of fluid containing nanoparticles significantly improves the interfacial stability during convection, i.e. increases the sweep area and dissolution efficiency.

Secondly, in the data measured by micro-focus CT in the laboratory (40° C./10 MPa), a comparative experiment of displacement of saline water by ordinary $CO_2$ and microbubble $CO_2$ in 30 cm Berea core was carried out, and the experimental process was as follows:
  a) a Berea core was placed to fill the porous media and leak tested before the experiment. Connect the hose to the water jacket outside the container, keep the circulating fluorine oil at a high temperature, and use a vacuum pump to evacuate all the gases in the pipeline system;
  b) saline was slowly injected into the container from low pressure to 10 MPa, after the pressure is raised to the target value, kept standing for 5 h to ensure that all pore spaces are fully saturated saline, and performed presetting on the imaging parameters of CT;
  c) a back pressure pump was used to stabilize the system pressure to an experimental pressure of 10 MPa, starting data acquisition including a thermocouple and a pressure sensor, monitoring the temperature and pressure of the system, then opening an inlet valve, and using an air pump to inject normal $CO_2$ or microbubble $CO_2$ at a constant rate upwards (the microbubble $CO_2$ is generated in situ by a perforated plate arranged on one side);
  d) the experimental procedure described above was repeated until regularly reliable core displacement data was obtained. This test analyzed 30 cm cores in three sections (each 10 cm in length).

In contrast, due to the characteristics of high specific surface area, high internal pressure, and high solubility of microbubble $CO_2$, the contact area with saline water and dissolution rate increased significantly. In the low porosity zone, microbubble has a "preferential" selection mechanism. In the low porosity zone of sandstone (taking the second section of the core as an example), the sweep efficiency increased by 3.2-4.9% (Table 1), and the other sections increased.

TABLE 1

Comparison of $CO_2$ saturation with injection volume fraction in each section of core

| Volume fraction of $CO_2$ injected | Bubble types | $CO_2$ Saturation (%) | | |
|---|---|---|---|---|
| | | First section | Second section | Third section |
| 0.15 | Microbubbles | 21.93 | 21.10 | 5.25 |
| | Ordinary bubbles | 26.21 | 16.21 | 7.04 |
| 0.18 | Microbubbles | 23.04 | 23.32 | 8.31 |
| | Ordinary bubbles | 28.00 | 18.54 | 9.65 |
| 2.50 | Microbubbles | 33.74 | 29.22 | 17.64 |
| | Ordinary bubbles | 29.23 | 26.02 | 19.18 |

In conclusion, the combination of the two advantages can significantly enhance $CO_2$ storage, dissolution, and mixing in the reservoir.

While the above examples are illustrative of specific embodiments of the present invention, it will be understood partial changes, substitutions and combinations of different methods performed by those skilled in the art within the scope of the technical solution shall be included in the scope of protection of the present invention.

What is claimed is:

1. A method for enhancing geological storage by injecting nanoparticles to stabilize $CO_2$ microbubbles, comprising:
step I: determining a location of an injection well:
  selecting a storage position to install the injection well, and installing a monitoring device (7) around the injection well;
step II: obtaining nanoparticles:
  receiving raw materials for preparing nanoparticles from a raw material collection tank (1) in a nano-sand mill (2) via a pipeline (1a), wherein the nano-sand mill (2) has a grind fineness of ≤200 nm; preparing the nanoparticles in the nano-sand mill (2),
  filtering out the nanoparticles with a nanoparticle filter (4); wherein the nanoparticle filter (4) comprises a nanofiltration plate (5) with a diameter <500 nm and a leak detection sensor (3); wherein the nanoparticles are received into the nanoparticles filter (4) via a pipeline (2a) and a valve (2b) from the nano-sand mill (2);
step III: pre-mixing $CO_2$ and the nanoparticles:
  introducing the $CO_2$ into a mixer (6) at a constant flow rate through a $CO_2$ pipeline (6a) and the nanoparticles through a nanoparticle pipeline (4b) fro nanoparticle filter (4) into the mixer (6), and mixing the $CO_2$ and the nanoparticles in the mixer (6) to obtain a mixed fluid;
  wherein the mixer (6) comprises a temperature and pressure monitoring device (11) and a magnetic stirrer (12); and
step IV: generating $CO_2$ microbubbles in a reservoir by a constant pressure injection:
  generating the $CO_2$ microbubbles by opening an injection well valve (6c) of an injection well (7), injecting the mixed fluid into a fluid in the reservoir while maintaining a constant reservoir pressure, placing a perforated plate (9) in a well shaft (10) of the injection well (7) at a bottom of the injection well (7), and flowing the mixed fluid through the perforated plate (9) to generate the $CO_2$ microbubbles, wherein the $CO_2$ microbubbles contain the nanoparticles from the mixed fluid; and
  wherein the perforated plate (9) comprises a corrosion-resistant material, and has an average pore size of 1 nm -1 μm; wherein an impurity filtering plate (8) is arranged before the perforated plate (9);
  wherein the raw materials for preparing nanoparticles are carbon nanoparticles, hydrophilic metal-based/metalloid nanoparticles, and/or wettable industrial waste residues;
  wherein the hydrophilic metal-based/metalloid nanoparticles are $SiO_2$ particles or $Fe_2O_3$ particles and the wettable industrial waste residues are waste cement powder or blast furnace slag.

* * * * *